United States Patent
Arias-Estrada et al.

(10) Patent No.: US 8,121,352 B2
(45) Date of Patent: *Feb. 21, 2012

(54) FAST THREE DIMENSIONAL RECOVERY METHOD AND APPARATUS

(75) Inventors: Miguel Arias-Estrada, San Pedro Cholula (MX); Alicia Morales-Reyes, Mexico City (MX); Maria Luisa Rosas-Cholula, Puebla (MX); Gerardo Sosa-Ramirez, Oaxaca (MX)

(73) Assignee: Prefixa International Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,680

(22) Filed: Jul. 30, 2010

(65) Prior Publication Data

US 2010/0295926 A1   Nov. 25, 2010

Related U.S. Application Data

(63) Continuation of application No. 11/564,263, filed on Nov. 28, 2006, now Pat. No. 7,769,205.

(51) Int. Cl.
*G06K 9/00* (2006.01)

(52) U.S. Cl. ........ 382/106; 382/108; 382/154; 345/419; 345/420

(58) Field of Classification Search .................. 382/106, 382/108, 154; 345/419, 420
See application file for complete search history.

(56) References Cited

U.S. PATENT DOCUMENTS

| | | | |
|---|---|---|---|
| 6,803,910 B2 | 10/2004 | Pfister | |
| 6,831,641 B2 | 12/2004 | Matusik | |
| 6,903,738 B2 | 6/2005 | Pfister | |
| 7,574,067 B2 | 8/2009 | Tu | |
| 7,623,701 B2 | 11/2009 | Kim | |
| 7,769,205 B2 * | 8/2010 | Arias-Estrada et al. | ...... 382/106 |

OTHER PUBLICATIONS

Lenz, R. K. and Tsai, R.Y., "Techniques for calibration of the scale factor and image center for high accuracy 3-D machine vision metrology," IEEE Transactions on Pattern Analysis and Machine Intelligence, 10(5):713-720, Sep. 1988.

Haralick, R. and Shapiro, L., Computer and Robot Vision, vol. II, Chapter 13, "Perspective Projective Geometry," pp. 43-124, AddisonWesley, Reading, MA, 1993.

Poelzleitner, W. and Ulm, M., "Comparative study of camera calibration algorithms with application to spacecraft navigation," Proceedings of SPIE, vol. 2350, Videometrics III, Sabry F. El-Hakim, Editor, Oct. 1994, pp. 187-196.

Brown, D. C., "Close-range camera calibration," Photogrammetric Engineering, vol. 37, No. 8, pp. 855-866, 1971.

(Continued)

*Primary Examiner* — John Strege
(74) *Attorney, Agent, or Firm* — Stephen W. Melvin

(57) ABSTRACT

The present invention comprises a method and an apparatus for three dimensional modeling to allow dense depth maps to be recovered, without previous knowledge of the surface reflectance, from only a single pair of stereo images. Several initial steps are performed for stereo and radiometric calibration and rectification for obtaining accurate results. The apparatus for the stereo images acquisition includes internal light sources, these are automatically commuted by a illumination control in order to fulfill the reciprocity property, a stereo camera head composed by the necessary optics to acquire the reciprocal stereo images and a compatible PC interface. The invention is faster than other systems since it requires only two images for obtaining a dense depth model of objects with an arbitrary surface reflectance distribution allowing the system to be used in a wide range of applications such as metrology, quality control, medical and dynamic three dimensional modeling.

26 Claims, 15 Drawing Sheets

OTHER PUBLICATIONS

Jian, X., Malcolm, A., and Zhongping, F., Camera Calibration with Micron Level Accuracy, SIMTech Technical Report (AT/01/037/PS), Singapore, 2001.

Janko, Z., Drbohlav, O., and Sara, R., "Radiometric calibration of a Helmholtz stereo rig," Proceedings of the 2004 IEEE Computer Society Conference on Computer Vision and Pattern Recognition, Jun. 27-Jul. 2, 2004, vol. 1, pp. 166-171.

Magda, S., Kriegman, D., Zickler, T., and Belhumeur, P., "Beyond Lambert: Reconstructing Surfaces with Arbitrary BRDFs," Proceedings of the International Conference on Computer Vision (ICCV), 2001, pp. 391-399.

Zickler, T., Belhumeur, P., and Kriegman, D., "Helmholtz Stereopsis: Exploiting Reciprocity for Surface Reconstruction," Proceedings of the 7th European Conference on Computer Vision (ECCV), May 2002, vol. 3, pp. 869-884.

Zickler, T., Ho, J., Kriegman, D., Ponce, J., and Belhumeur, P., "Binocular Helmholtz Stereopsis," Proceedings of the International Conference on Computer Vision (ICCV), 2003, pp. 1411-1417.

Micron, "MT9T001 1/2-Inch 3-Megapixel CMOS Digital Image Sensor," Data Sheet, Micron Technology, Inc., Jul. 2005.

* cited by examiner

FAST THREE DIMENSIONAL RECOVERY METHOD AND APPARATUS

RELATED APPLICATIONS

This application is a continuation of U.S. patent application Ser. No. 11/564,263, filed on Nov. 28, 2006, now U.S. Pat. No. 7,769,205, which is incorporated herein by reference.

FIELD OF THE INVENTION

The present invention relates to stereo vision, particularly to a method and an apparatus for stereo and radiometric calibration, a three dimensional stereo technique and depth map calibration process to obtain accurate dense depth maps without previous knowledge of surface reflectance.

BACKGROUND

Stereo vision consists of three-dimensional data recovery of an object viewed from two or more view-points. Some fields of application for stereo vision are industrial, such as quality control of production lines, where concepts of inspection and sampling to remove defective products are required. Medicine is another important field where highly accurate models are required by specialists. Obtaining dense and accurate three-dimensional models is computationally expensive and can cause a bottleneck on production lines.

Stereo vision generally involves several stages. First, a calibration process is necessary. This process comprises both stereo and radiometric aspects. After that, a correspondence analysis is applied to the stereo images and finally the three dimensional model is obtained.

The calibration process generally consists of stereo and radiometric stages. The stereo calibration stage is solved by the geometric calibration of each camera independently and then a geometric transformation is applied to find out the geometry of the stereo setting. This geometric calibration leads to knowledge of rotation and position of the camera (commonly called the extrinsic camera parameters) and its internal characteristics (intrinsic camera parameters) such as focal length, position of the principal point, difference in scale of the image axes and so on.

There are many calibration methods that have been described for use with commercially available cameras. One such example is described in TSAI, R. Y., "An efficient and accurate camera calibration technique for 3D machine vision," Proceedings IEEE Conference on Computer Vision and Pattern Recognition (CVPR), Miami Beach, Fla., 1986, pp. 364-374, and also in LENZ, R. K. and TSAI, R. Y., "Techniques for calibration of the scale factor and image center for high accuracy 3-D machine vision metrology," IEEE Transactions on Pattern Analysis and Machine Intelligence, 10(5):713-720, September 1988, both of which are incorporated herein by reference.

In the articles cited above, Tsai and Lenz proposed a practical solution for off-the-shelf camera calibration. This solution estimates the relative rotation and translation by introducing a radial alignment constraint. Using these estimated values, the camera parameters can be derived by optimization. Although Tsai's model is widely used in computer vision, it produces the poorest result among other models widely used.

Another popular method is known as "Direct Linear Transformation" (DLT), and is described in ABDEL-AZIZ, Y. I. and KARARA, H. M., "Direct linear transformation into object space coordinates in close-range photogrametry," Proceedings Symposium Close-Range Photogrametry, pp. 1-18, University of Illinois, Urbana, 1971, incorporated herein by reference. A limitation of the DLT model is that it does not take care of lens distortion, which may severely affect the measurement accuracy.

Another classical calibration techniques is known as Haralick's standard solution, and is described in HARALICK, R. and SHAPIRO, L., Computer and Robot Vision, Volume II, Chapter 13, "Perspective Projective Geometry," pp. 43-124, Addison Wesley, Reading, Mass., 1993 and in POELZLEITNER, W. and ULM, M., "Comparative study of camera calibration algorithms with application to spacecraft navigation, "Proceedings of SPIE, vol. 2350, Videometrics III, Sabry F. El-Hakim, Editor, October 1994, pp. 187-196, both of which are incorporated herein by reference.

Haralick's standard solution uses an iterative method to find three extrinsic camera parameters (three angles for the rotation between world and pinhole coordinate system) and seven intrinsic parameters (three camera distortion factors, image center as well as scale factors in both horizontal and vertical image coordinates). One problem with Haralick's standard solution is that the non-linear equations make it impossible to get a direct solution. Thus, partial differentiation of the non-linear equation is generally used and the high order non-linear terms are omitted before iteration can be performed. This means a good guess of initial parameters must be available and it cannot be guaranteed that the iteration will get a convergent result. A similar non-linear optimization method is described in BROWN, D. C., "Close-range camera calibration," Photogrammetric Engineering, vol. 37, no. 8, pp. 855-866, 1971, incorporated herein by reference.

Many of the disadvantages of the methods discussed above are addressed with a new calibration approach derived from the Haralick model, known as the Gintic model, and is described in JIAN, X., MALCOLM, A., and ZHONGPING, F., Camera Calibration with Micron Level Accuracy, SIMTech Technical Report (AT/01/037/PS), Singapore, 2001, incorporated herein by reference. The Gintic model simplifies the Haralick model equations and guarantees that the optimal solution is always found, and this approach finds the camera parameters which best describe the camera behavior.

The second stage of calibration is radiometric calibration. This step is necessary to recover depth information from the objects in the scene considering an arbitrary or unknown surface reflectance. The calibration of light anisotropy and the relative orientation of the anisotropy with respect to the camera are fulfilled after the radiometric calibration. Radiometric calibration is required on the assumption that camera photo-response is not linear and spatially non uniform and the lights are not isotropic. The article JANKO, Z., DRBOHLAV, 0., and SARA, R., "Radiometric calibration of a Helmholtz stereo rig," Proceedings of the 2004 IEEE Computer Society Conference on Computer Vision and Pattern Recognition, 27 Jun.-2 Jul. 2004, vol. 1, pp. 166-171, incorporated herein by reference, illustrates that radiometric calibration improves accuracy on depth data recovery.

After radiometric and geometric calibration, the next step for three-dimensional stereo recovery is the correspondence analysis which is commonly classified as either active or passive, depending on the illumination control. Active approaches adopt light scene manipulation, for example photometric stereo illumination, while passive methods do not depend on the scene illumination. The surface reflectance distribution depends on the incident illumination over the scene objects and the material of the object. Therefore, active and passive approaches both require a previous consideration of surface reflectance, which is assumed, either implicitly or explicitly.

Passive stereo approaches assume implicitly the reflectance of surfaces. That is, they assume that the reflectance of the scene objects is the same regardless the acquisition viewpoint. On the other hand, active stereo approaches establish a known parametric reflectance form. That is, they calculate a reflectance function from different physical models, and later they include this function in the recovery constraint. Both considerations are not valid in the real world, since reflectance depends on different aspects, such as optical characteristics of surfaces, illumination incidence angle, optical viewpoints positions, etc.

Other three dimensional recovery techniques refer to systems in which the scene is illuminated by a known geometrical pattern of light. These are known as structured lighting systems, and they make use of the triangulation principle to compute depth. The main disadvantage of structured lighting methods is that they require several image acquisitions (in the order of 4 to 32) under different lighting conditions in order to obtain a dense depth map, so that, these recovery techniques are computationally expensive methods, and they are not presently practical for fast 3D acquisition applications like production lines inspection or object modeling Recently a new stereo technique has been proposed in MAGDA, S., KRIEGMAN, D., ZICKLER, T., and BELHUMEUR, P., "Beyond Lambert: Reconstructing Surfaces with Arbitrary BRDFs," Proceedings of the International Conference on Computer Vision (ICCV), 2001, pp. 391-399, and ZICKLER, T., BELHUMEUR, P., and KRIEGMAN, D., "Helmholtz Stereopsis: Exploiting Reciprocity for Surface Reconstruction," Proceedings of the 7th European Conference on Computer Vision (ECCV), May 2002, vol. 3, pp. 869-884, both of which are incorporated herein by reference. This new approach is proposed to achieve the recovery of depth information of scene objects considering an arbitrary or unknown surface reflectance.

This recent stereo technique takes advantage of the reflectance symmetry of surfaces. Reflectance symmetry, or reciprocity, allows an arbitrary form of surface reflectance. Thus, under a controlled illumination environment, the restrictions caused by optical properties inherent to surface materials are eliminated, and depth recovery from any kind of surfaces can be obtained.

The stereo technique based on the reflectance reciprocity has other advantages, for example, since stereo images have reciprocal irradiance, the specularities appear fixed over the surface, which is an advantage over other stereo approaches, because it is possible to match corresponding specular regions. Moreover, half-occluded regions are corresponding. That is, a half-occluded region on the left stereo image appears shadowed on the right stereo image, and vice versa. This property may enhance the quality of depth reconstruction since it allows determining depth discontinuities. Furthermore, textureless and flat surfaces cannot be recovered using either active or passive conventional stereo techniques.

A simplification of the multi-ocular stereo case is presented in ZICKLER, T., HO, J., KRIEGMAN, D., PONCE, J., and BELHUMEUR, P., "Binocular Helmholtz Stereopsis," Proceedings of the International Conference on Computer Vision (ICCV), 2003, pp. 1411-1417, incorporated herein by reference. This article proposes a method for how a dense depth map can be retrieved from a single pair of reciprocal stereo images, considering orthographic point's projection.

Unfortunately, this article does not illustrate how such a technique can be easily integrated with the calibration process. In particular, a mechanical calibration process is assumed in which the cameras are re-positioned and detailed measurements are made. The aforementioned article also does not illustrate the steps involved in the proposed approach. Furthermore, Zickler's approach establishes a stereo analysis considering an orthographic point projection. This kind of projection geometry can be achieved if the stereo setup is far away from the scene objects. Therefore, this restriction eliminates the possibility of a practical set up which can be used on industrial tasks where space is an important constraint.

Accordingly, there is a need for a method and apparatus for three-dimensional depth recovery utilizing the concept of reflectance reciprocity that does not have the limitations stated above. In particular, there is a need for a complete system, that is, a practical method and apparatus, which tackles all the stages of a highly accurate three-dimensional recovery process, from camera calibration to a final grid adjustment process, including some specific tasks related with the reciprocal reflectance property. Moreover, a complete system should fulfill the real-time requirements of applications such as industrial inspection.

BRIEF SUMMARY OF THE INVENTION

The invention provides a method and an apparatus for acquiring stereo images which fulfill the reciprocity reflectance property to recover depth information of an object placed into the field of view of a single or multi stereo cameras array. This particular property of surface reflectance allows three dimensional modeling of objects regardless their reflectance distribution, that is, the system can handle textureless and specular surfaces while conventional and photometric stereo techniques fail. In a preferred embodiment, the present invention utilizes an extended binocular approach which does not have any restriction related with the projection geometry or the camera setup configuration.

The system uses a stereo and radiometric calibration process prior to the capture of object images. The stereo calibration process requires two stereo pairs of a calibration pattern for modeling the intrinsic and extrinsic parameters of a single or multiple stereo camera arrays. The radiometric calibration needs a single stereo pair of reciprocal images of a white calibration pattern to apply an isotropic light distribution to the stereo images. Finally, a stereo rectification process is applied in order to fulfill the epipolar constraint and recover depth information of the object in the scene.

A dense three dimensional model is obtained, according to the invention, by stereo and radiometric calibration procedures. After this, a stereo rectification process is applied to fulfill the epipolar constraint. Then, an algorithm for three dimensional recovery is applied over complementary epipolar lines in order to obtain dense depth data from the object in the scene. Finally a depth map calibration process is applied for obtaining highly accurate 3D point cloud.

The system has a stereo head with an interior illumination control which includes a beam—splitter in order to align the optical axis with the beam of light. Alternatively, an exterior illumination distribution can be utilized, which consists of placing the light source near of the optical center. The apparatus is designed considering an acquisition process which allows the automatic commutation of the stereo light sources to fulfill the reciprocity property of the images.

The system is fully automatic, easy to use, has a simple setup and calibration process. The system is unique in that it requires only two object images for highly accurate three dimensional modeling of objects regardless their reflectance distribution. Therefore, it is potentially faster than other 3D scanners or 3D recovery systems, such that, the system may be used in a wide range of applications as metrology, quality control, medical, dynamic three dimensional modeling and so on.

The system of the present invention simplifies the light control to obtain stereo images with symmetrical intensity curves. Unlike others photometric stereo techniques, this approach obtains the depth measures of the object in the scene directly, avoiding the normal field integration which means an important reduction of the computational cost.

Additionally, an embodiment of the imaging apparatus allows a stereo camera configuration with a parallel and convergent optical axis. This option could also be applied to an extended multi-view camera system.

DETAILED DESCRIPTION

System Configuration

Figure 1:
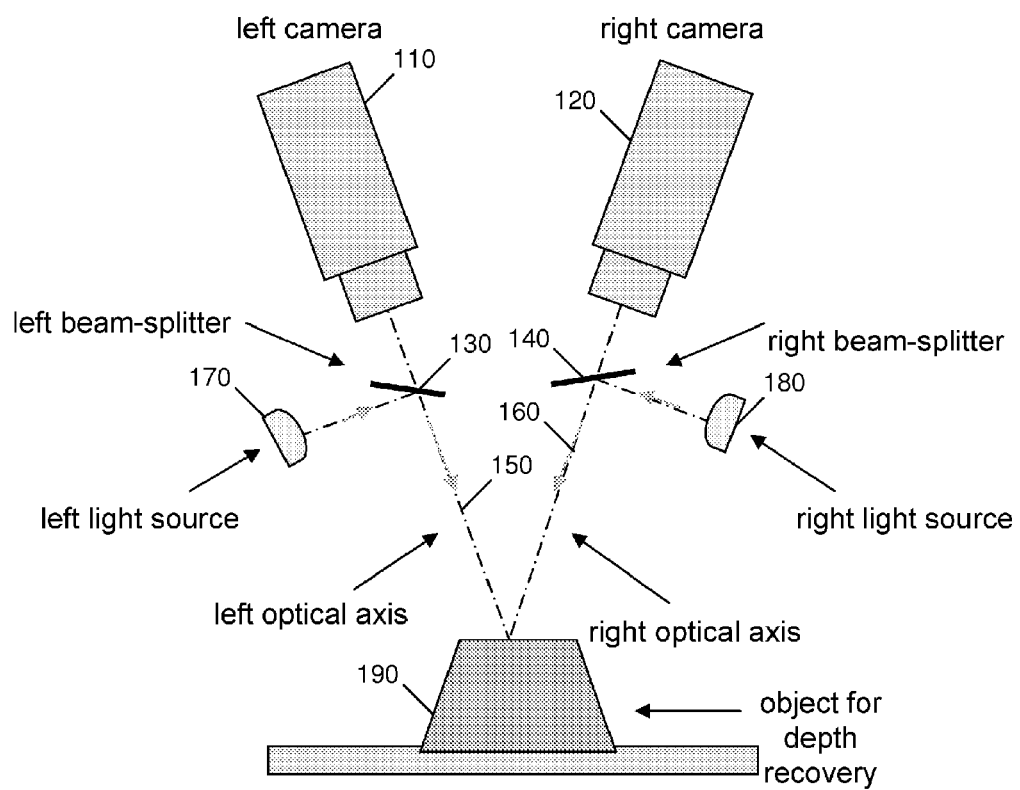
FIG. 1 is a diagram of the general principle of the invention.

FIG. 1 illustrates the general principle of the invention. Left camera 110 and right camera 120 capture images from object 190. A left light source 170 and a left beam-splitter 130 are utilized so that object 190 is illuminated along left optical axis 150 when an image is captured by right camera 120, and similarly right light source 180 and right beam-splitter 140 are utilized to illuminate object 190 along right optical axis 160 when an image is captured by left camera 110.

Figure 2:
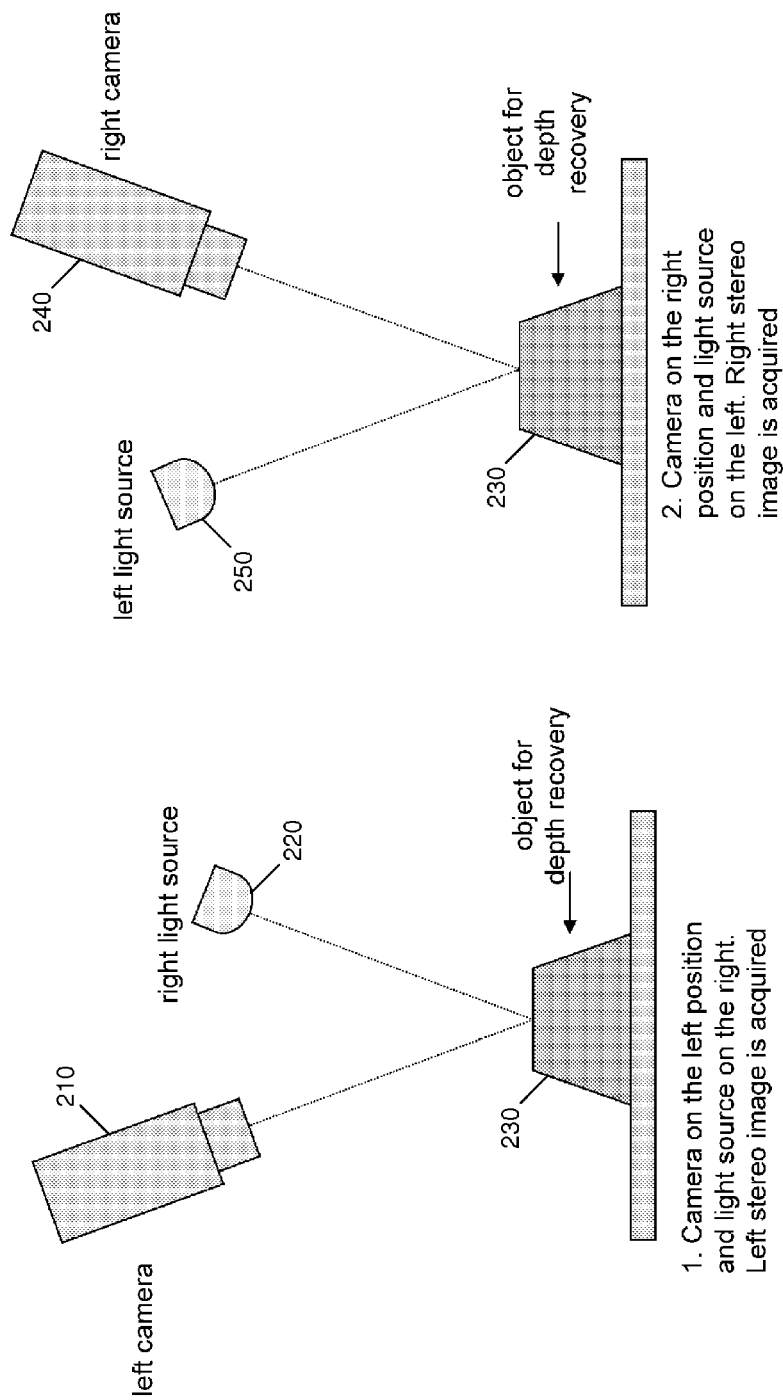
FIG. 2 is a diagram of the general image acquisition process.

The image acquisition process is illustrated in more detail in FIG. 2. Left camera 210 captures an image of object 230 when illuminated by right light source 220. In this manner the left stereo image is acquired. Right camera 240 captures an image of object 230 when illuminated by left light source 250. In this manner the right stereo image is acquired. After both images have been acquired, the present invention can recover depth information, as is described in detail below.

Figure 3A:
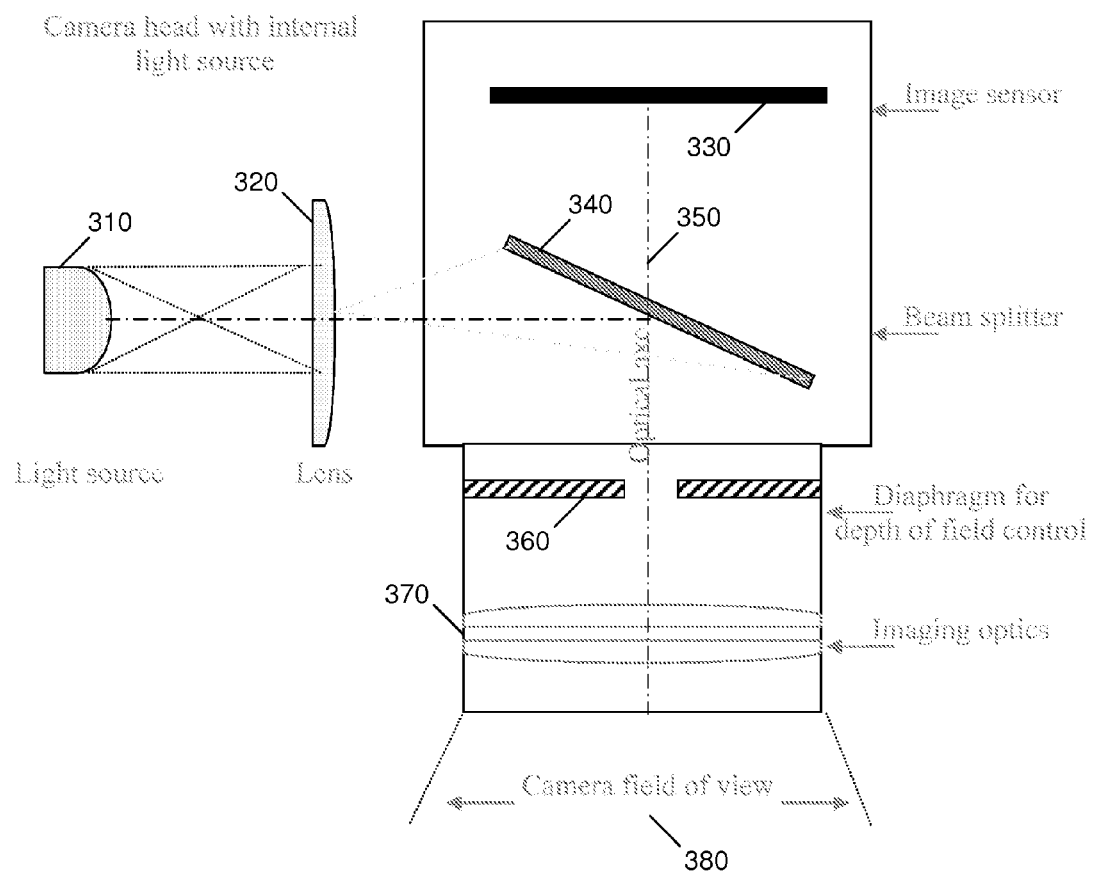
FIG. 3A is a diagram of the camera head considering interior light control.
Figure 3B:
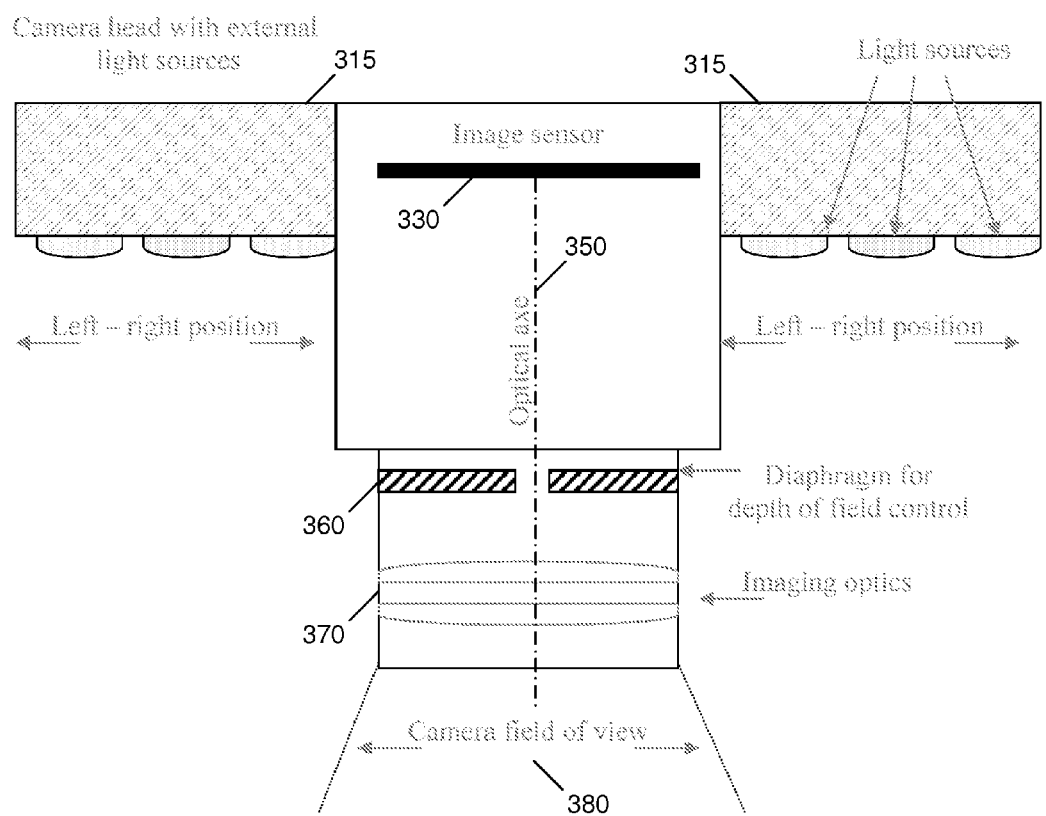
FIG. 3B is a diagram of the camera head considering exterior light control.
Figure 4:
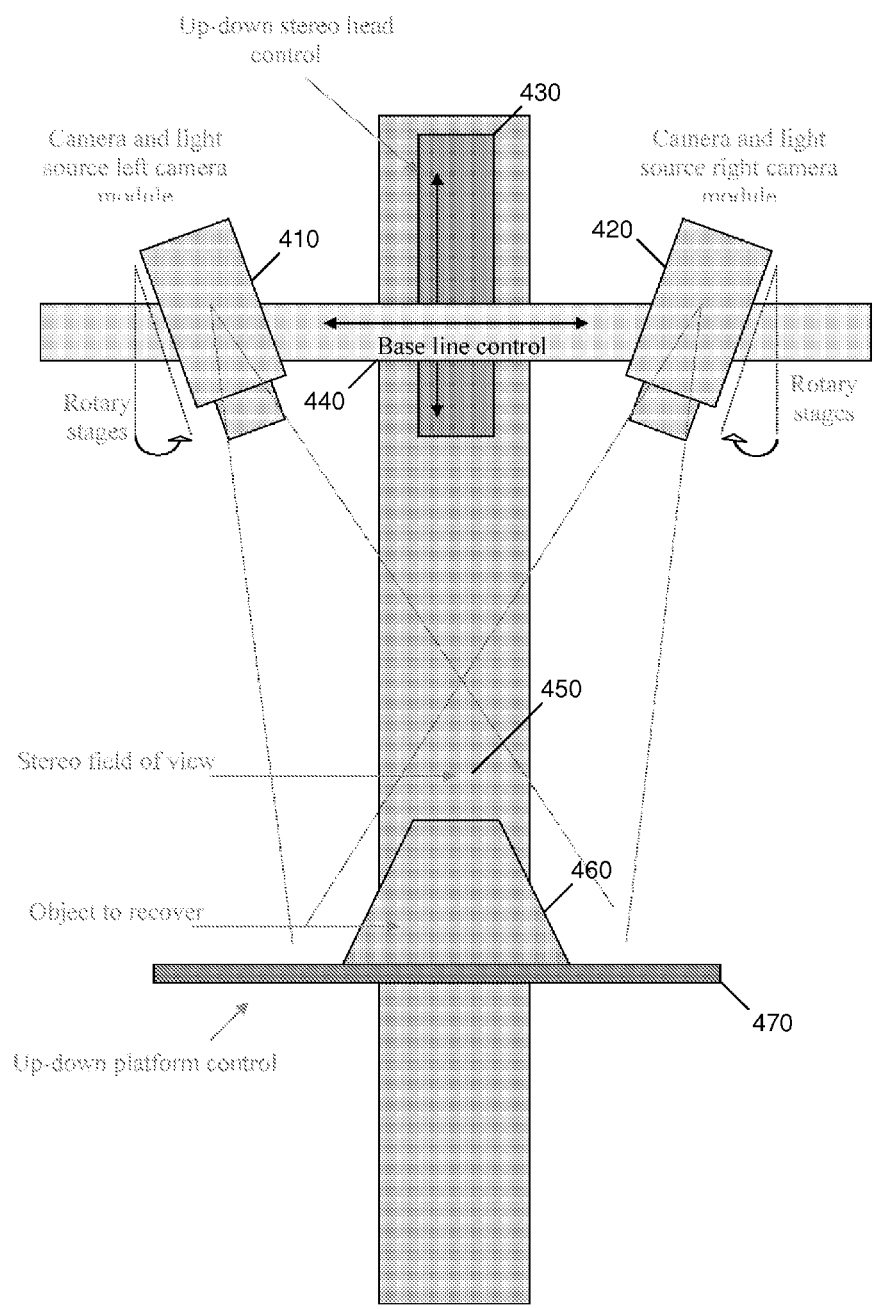
FIG. 4 is a diagram of the basic stereo recovery apparatus.

FIGS. 3A and 3B illustrate in more detail two alternative camera and illumination mechanism, and FIG. 4 shows a complete system for calibration and modeling a three dimensional object according to the invention. The system illustrated in FIG. 4 includes camera and light source modules 410 and 420, which can be internally illuminated according to FIG. 3A or alternatively externally illuminated according to FIG. 3B. Camera and light source modules 410 and 420 also include cameras and a compatible PC interface. The cameras can be rotated to image the object from multiple viewpoints. The rotation allows considering different geometries.

The internal illumination camera modules, illustrated in FIG. 3A include a beam-splitter 340 in order to align the optical axis 350 with the beam of light originating from light source 310 and passing through lens 320. Image sensor 330 is used to capture an image of the object and also included in the module are diaphragm 360 for depth of field control and imaging optics 370. The object to be imaged and illuminated is placed within the camera field of view 380.

The external illumination camera modules, illustrated in FIG. 3B include light sources 315. As in FIG. 3B, image sensor 330 is used to capture an image of the object and along optical axis 350, through diaphragm 360 and imaging optics 370. During object imaging, the stereo light sources are automatically switched, in such a way that symmetrical reciprocity of image irradiance is obtained.

The cameras used in the modules illustrated in FIGS. 3A and 3B are composed of CMOS digital image sensors and optical lenses. An example of an image sensor that can be used in an embodiment of the invention is the MT9T001 ½-Inch 3-Megapixel CMOS Digital Image Sensor manufactured by Micron Technology, Inc., the data sheet for which is incorporated herein by reference.

The MT9T001 sensor provides full-frame images in a wide range of formats. The pixel array in the CMOS sensor is configured as 2048 columns by 1536 rows. 25 mm or 12 mm lenses are alternatively used, depending of the field of view required to image the object. In one embodiment of the present invention, the cameras are capable of acquiring full resolution RGB images at 12 frames per second (fps) and they are connected to a computer via a USB port. In one embodiment, such computer has a 1 GHz Pentium III processor and 512 Mb of RAM.

As illustrated in FIG. 4, the object 460 to be modeled is placed on a up-down platform 470 into the field of view 450 of the camera array. Base line control 440 is used to move camera and light source modules 410 and 420 left and right and up-down stereo head control 430 is used to move camera and light source modules 410 and 420 up and down.

The basic system concept can be extended to consider different geometries for spatial point's projection. That is, orthographic projection and perspective projection, in order to allow light sources and cameras arrays organized in different configurations. The orthographic and perspective projections are described in greater detail below.

System Functionality

In FIG. 2, the general principle of acquisition is illustrated. This principle allows one to acquire a set of images of an object placed into the field of view of a camera array. In this example, the camera array can be rotated within a range of 40 degrees with steps of ten degrees, so that the object can be imaged from 4×4 different user specified viewpoints. Although the angular positions of the cameras are repeatable, the calibration process is repeated for obtaining accurate results. Camera positions and angles are dependent on the application, and the method presented can be adapted to any multiple camera position configuration.

Figure 5:
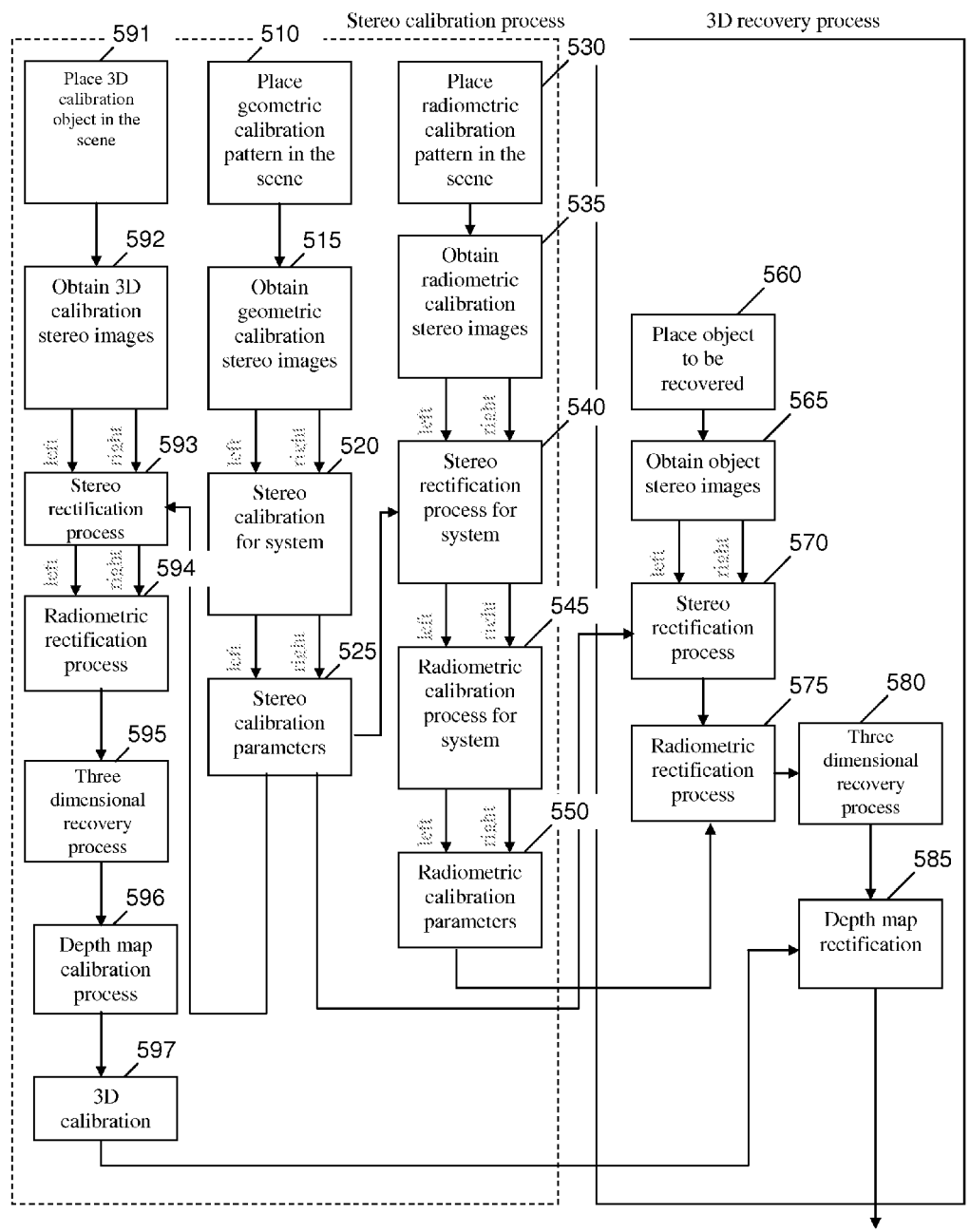
FIG. 5 is a general diagram of the 3D recovery process.

FIG. 5 illustrates the overall calibration and 3D recovery process. The steps illustrated on the left represent the stereo calibration process and the steps illustrated on the right represent the 3D recovery process. During calibration the cameras acquire three sets of images: stereo calibration images, radiometric calibration images, and 3D calibration object images. In step 510 a geometric calibration pattern is placed in the scene and in step 515 a set of stereo calibration images is obtained. As is explained in detail below, step 520 performs stereo calibration and step 525 generates stereo calibration parameters. In step 530 a radiometric calibration pattern is placed in the scene and in step 535 a set of stereo calibration images is obtained. As is explained in detail below, step 540 performs stereo rectification, step 545 performs radiometric calibration, and in step 550 a set of radiometric calibration parameters is obtained. The final stage in the calibration process involves placing a 3D calibration object in the scene in step 591. A 3D calibration object is placed in the scene and in step 592 a set of 3D calibration stereo images is obtained. Step 593 performs the stereo rectification process, step 594 performs the radiometric rectification process, step 595 performs the three dimensional recovery process and step 596 performs the depth map calibration process. Finally, in step 597 a set of 3D calibration parameters is obtained.

Calibration only needs to be performed once in a preprocessing step for a particular arrangement of the cameras. Subsequently, an object to be recovered is placed in the scene in step 560 and a set of images are acquired in step 565. As is explained in detail below, a stereo rectification process takes place in step 570 followed by a radiometric rectification process in step 575, a three dimensional recovery process in step 580 and a depth map rectification in step 585. The acquisition and processing of the images is automated after the object has been placed on the field of view of the cameras. Then, the three dimensional recovery is achieved completely automatically.

The object used for the 3D calibration images is a calibration object or pattern with visually detectable features painted on it. The set of radiometric calibration images is acquired of a calibration object or pattern with a uniformly distributed gray level. These sets of images are acquired while the calibration object is illuminated with automatically commuted stereo light sources.

During the three dimensional recovery process, the set of object images is acquired while the object is illuminated with an automatically commuted stereo light sources. This set allows three dimensional modeling of objects regardless their reflectance distribution as described in greater detail below. In one embodiment of the invention, the sets of images acquired can be displayed on a monitor while the images are acquired.

A key difference between the present invention and the prior art is that the system of the present invention only uses two object images to perform three dimensional modeling of objects regardless their reflectance distribution. The system takes advantage of the reflectance symmetry of surfaces, that is, the system can handle textureless and specular surfaces.

Another key difference with the prior art is that the system of the present invention uses interior illumination sources to align the optical axis with the beam of light. This allows for the automatic commutation of the stereo light sources to fulfill the reciprocity property of the images.

Figure 6:
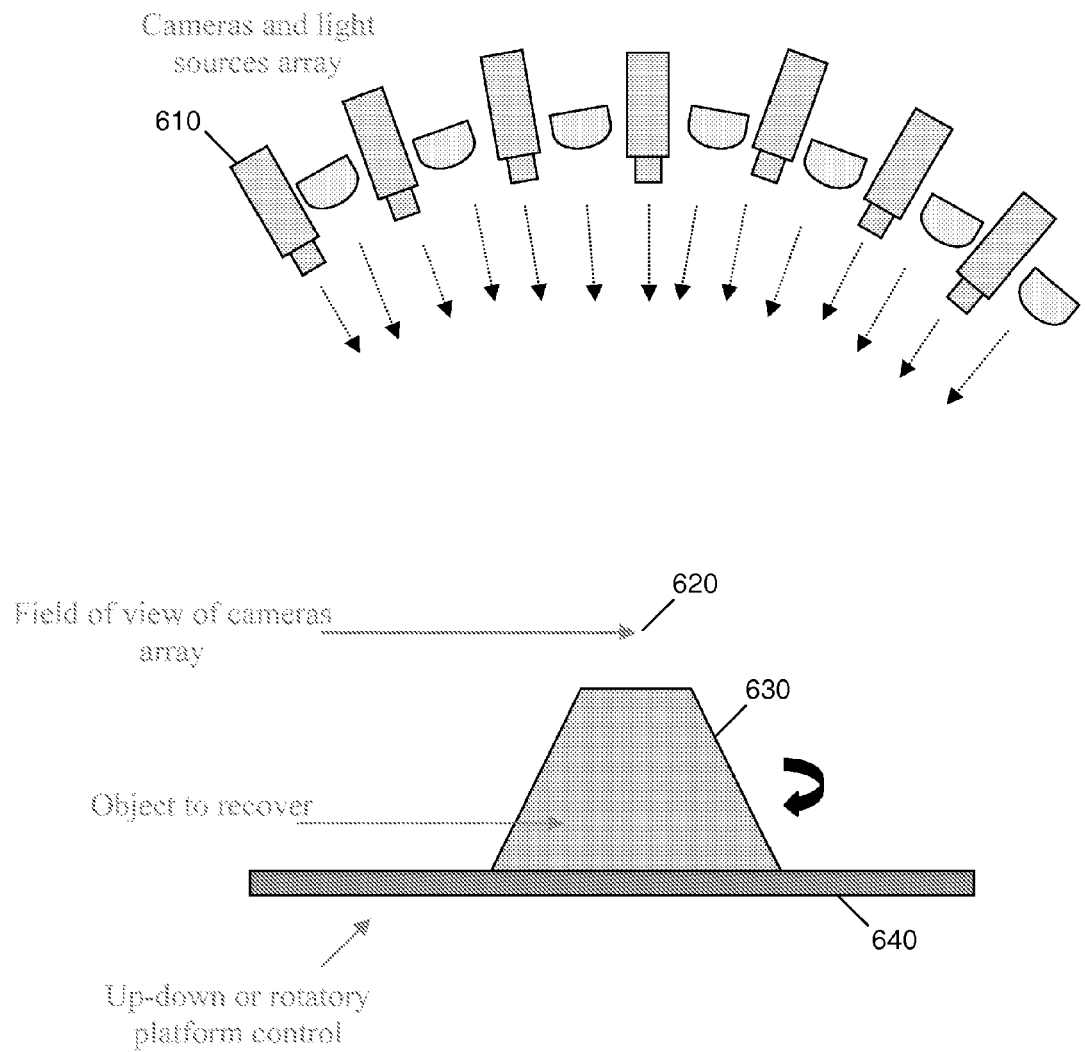
FIG. 6 is a diagram of the possible extensions of the apparatus.

It should be noted that other equivalent systems can be built within the scope of the present invention. For example, instead of using internal light sources, the lights can be in external locations; the cameras or objects can be rotated to acquire full 360 degrees 3D models; the system may be composed by stereo cameras and light sources arrays 610 organized in different configurations on up-down or rotary platform 640, in order to image the object 630 placed in field of view 620 from different points of view, as FIG. 6 shows.

Image Acquisition Procedure

Bayer Procedure

In the preferred embodiment, the images are acquired using a Bayer-filter de-mosaicing technique, which can be used since the raw output of Bayer-filter cameras is available. Since each pixel is filtered to record only one of three colors, two-thirds of the color data is missing from each pixel. To obtain a full-color image, various de-mosaicing algorithms can be used to interpolate a set of complete red, green, and blue values for each point.

The bilinear interpolation algorithm may be applied for the full-color image recovery. This algorithm calculates the complete red, green, blue values for each pixel as follows:

1. Interpolation of green pixel. The average of the upper, lower, left and right pixel values is assigned as the green value of the interpolated pixel.

2. Interpolation of red/blue pixels:

2a. Interpolation of a red/blue pixel at a green position: the average of two adjacent pixel values in corresponding color is assigned to the interpolated pixel.

2b. Interpolation of a red/blue pixel at a blue/red position: the average of four adjacent diagonal pixel values is assigned to the interpolated pixel.

Stereo Calibration Images

The set of stereo calibration images is acquired by placing a calibration object or pattern into the field of view of the cameras array and, if necessary, adjusting the position and aperture of the cameras. The set of calibration images of a known calibration object is acquired. In a preferred embodiment the known calibration object consists of a chessboard pattern. With the up-down platform the calibration target is placed in two different distances, so, two images of the calibration target are taken from each of the cameras. Camera parameters are determined using a calibration procedure for stereo system, which is described in greater detail below.

Radiometric Calibration Images

The set of radiometric calibration images is acquired by placing a calibration object or pattern into the field of view of the cameras array. The set of radiometric calibration images of a known gray level pattern (for example a test pattern of white balance) is acquired from each of the cameras. During calibration image acquisition, the light sources are automatically commuted.

3D Calibration Object Images

The 3D calibration object, for example a triangular gauge block, it is placed into the field of view of the cameras array, and the set of calibration object images is acquired while the light sources are automatically commuted.

Object Images

The object is placed into the field of view of the cameras array, and the set of object images is acquired while the light sources are automatically commuted. The object location lies within the boundary of the geometric calibration target.

Stereo Calibration Procedure

Figure 7:
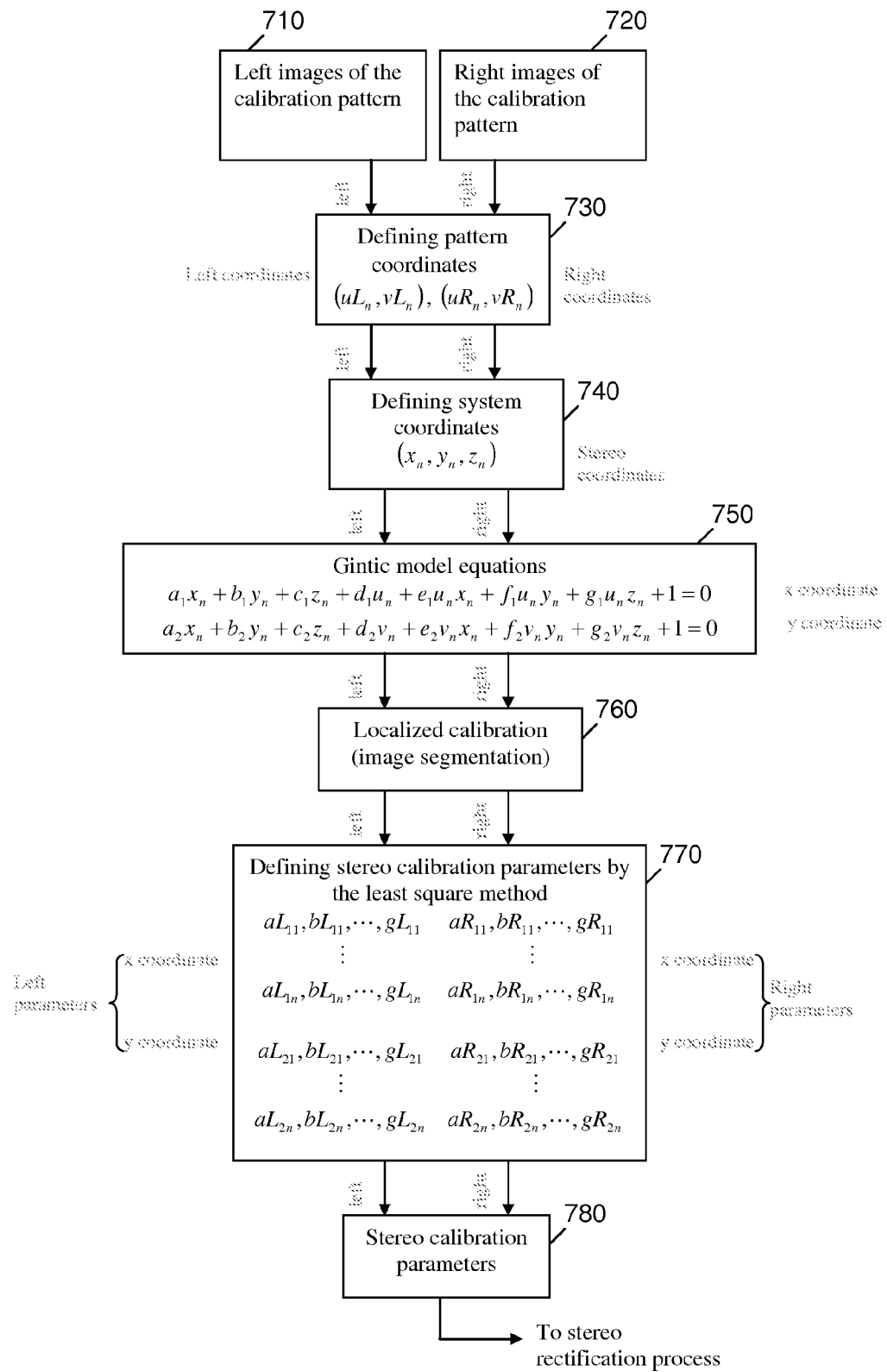
FIG. 7 is a block diagram of the stereo calibration process.

FIG. 7 illustrates the stereo calibration procedures. Stereo calibration requires three sets of scene-image coordinate pairs. The set of scene-coordinate is measured directly on the calibration pattern, the corresponding two sets of image-coordinate pairs have to be detected in the images acquired from each of the cameras. In order to allow such detection, the pattern is equipped with visually significant features painted on them; these features are called control points. The left images of the calibration pattern are input in step 710 and the right images of the calibration are input in step 720.

To develop the camera model which describes the projection of any 3D point to the image plane, we need to define the following system coordinates: xyz, the scene or world coordinates of control points. These coordinates are measured directly on the geometric calibration pattern. The rank of z is defined according the depth of the object to be recovered. $u_L v_L$, the corresponding left image coordinates of control points and $u_R v_R$, the corresponding right image coordinates of control points. These coordinates have to be detected in the image. The positions of the control points within the image are detected in step 730 and the real world system coordinates are input in step 740.

Positions of the control points in the acquired images are detected with an auto-detection algorithm. This auto-detection algorithm is based on the Harris corner detection method which calculates an interest operator defined according to the auto-correlation of Gaussian smoothed images. The size of convolution mask gives a trade off between the localization of corners and the amount of noise excluded. Auto-correlation may be defined as the sum of squares of the difference of image intensities $$\delta I(\delta x, \delta y) = \sum_{ij \in patch} (I_1(i + \delta x, j + \delta y) - I_1(i, j))^2 \quad (1)$$

whose analytic Taylor expansion is $$\delta I(\delta x, \delta y) = (\delta x, \delta y) N \begin{pmatrix} \delta x \\ \delta y \end{pmatrix} \quad (2)$$

where $$N(x, y) = \begin{bmatrix} I_x^2 & I_x I_y \\ I_x I_y & I_y^2 \end{bmatrix} \quad (3)$$

The two eigenvalues of N are proportional to the principal curvatures of N and functions of them have the property of rotational invariance. When the trace of the matrix is large there is an edge and when the determinant is large there is an edge or a corner. A corner strength signal is $$\Phi(x,y) = |N(x,y)| - \kappa \operatorname{Trace}^2 N(x,y) \quad (4)$$

where $\kappa$ is a constant value. Corner are defined at the local maxima of two dimensional quadratic patches fitted to $\Phi(x, y)$, resulting in sub-pixel accuracy, $$ax^2 + by^2 + cxy + dx + ey + f = \Phi(x,y) \quad (5)$$

using the nine pixels around (x,y) this leads to 9 equations in 6 unknowns that can be solved by the least squares method.

Gintic Model Equations

The camera calibration model defines ten initial parameters for each camera, these parameters are: $\omega$, angle of rotation around the x-axis; $\phi$, angle of rotation around the y-axis; $\kappa$ angle of rotation around the z-axis; $a_u$, u-axis focal length; $a_v$, v-axis focal length; $k_1$ $k_2$, $k_3$, parameters for the radial geometric distortion of lens; $(u_p, v_p)$, principal point in the image coordinates. The relationship between world coordinate system and camera reference coordinate system can be represented by the following equation:

$$\begin{pmatrix} p_n \\ q_n \\ s_n \end{pmatrix} = R(\omega, \phi, \kappa) \begin{pmatrix} x_n \\ y_n \\ z_n \end{pmatrix} \quad (6)$$

Then, we can obtain its perspective projection. Assuming a pinhole camera model and the image plane is at a distance f (focal length, converted into $a_u$ and $a_v$ to reflect the focal factors in image coordinates) from the pinhole position, we have $$(1 + k_1 r_n^2 + k_2 r_n^4 + k_3 r_n^6) \begin{pmatrix} u_n - u_p \\ v_n - v_p \end{pmatrix} = \frac{1}{s_n} \begin{pmatrix} a_u p_n \\ a_v q_n \end{pmatrix} \quad (7)$$

where $$r_n^2 = (u_u - u_p)^2 + (v_u - v_p)^2 \quad (7a)$$

Further simplifying equation (7) we can rearrange it as equation (8) and equation (9), utilized in step 750:

$$a_1 x_n + b_1 y_n + c_1 z_n + d_1 u_n + e_1 u_n x_n + f_1 u_n y_n + g_1 u_n z_n + 1 = 0 \quad (8)$$

and $$a_2 x_n + b_2 y_n + c_2 z_n + d_2 v_n + e_2 v_n x_n + f_2 v_n y_n + g_2 v_n z_n + 1 = 0 \quad (9)$$

This model uses 14 parameters ($a_{1L}, a_{2L} \ldots g_{1L}, g_{2L}$) for the left camera and 14 parameters ($a_{1R}, a_{2R}, \ldots g_{1R}, g_{2R}$) for the right camera to describe the mapping from 3D world $x_n y_n z_n$ to the 2-D image coordinates $u_{nL}$ and $v_{nL}$ for left camera and $u_{nR}$ and $v_{nR}$ for right camera. These parameters are represented by box 780. The linear equations (8) and (9) used in step 750 can be solved and always lead to a stable result when at least seven calibration target points are available for each camera.

Localized Calibration

Localized calibration 760 comes from the observation that the distortion of camera lenses is never symmetrical and thus cannot be represented by global parameters like $k_1, k_2$, and $k_3$. The idea of the localized calibration is segmenting the total calibration area into overlapped sections, where we are able to get the localized calibration parameters for each section which best describe the camera behavior there. We achieve this by feeding the equations (8) and (9) in step 750 with world and image coordinates of calibration target points belong to that particular section. As long as the section contains more than 7 target points, the localized parameters can be calculated by applying least square solution in step 770 to equations (8) and (9). It should be noted that such calibration has to be done for each camera of the system.

Stereo Rectification Procedure

Figure 8:
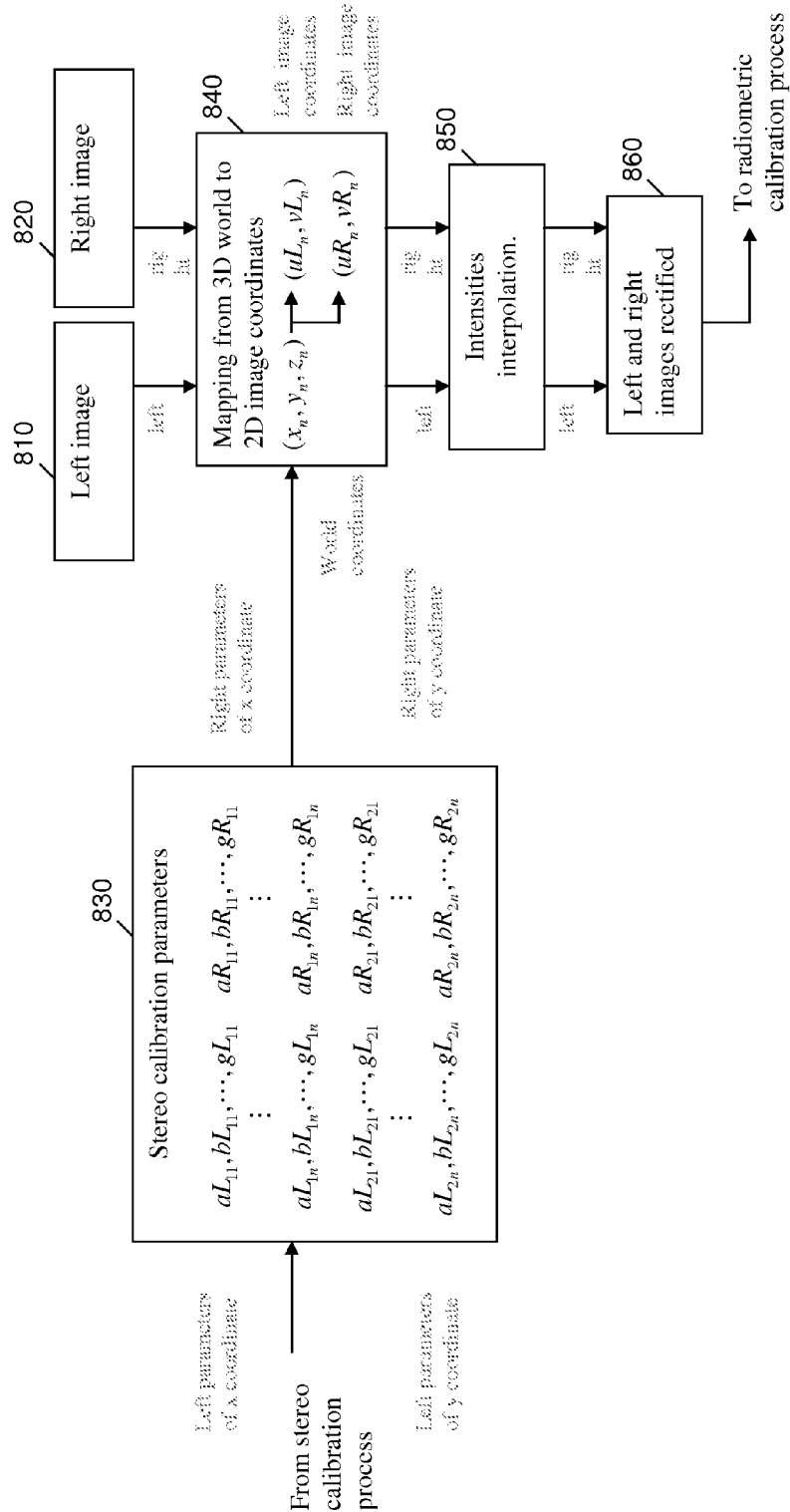
FIG. 8 is a block diagram of the stereo rectification process.

As shown in FIG. 8, once the stereo calibration parameters are obtained for each view point of the stereo rig, the stereo rectification process must be applied. The epipolar constraint is fulfilled by applying the calibration parameters to the stereo images.

The relationship between world coordinates and image coordinates can be represented by the following equations, utilized in step 840:

$$u_n = \frac{[a \ b \ c]\begin{bmatrix} x_n \\ y_n \\ z_n \end{bmatrix} + 1}{d + [e \ f \ g]\begin{bmatrix} x_n \\ y_n \\ z_n \end{bmatrix}} \quad (10)$$

$$v_n = \frac{[a \ b \ c]\begin{bmatrix} x_n \\ y_n \\ z_n \end{bmatrix} + 1}{d + [e \ f \ g]\begin{bmatrix} x_n \\ y_n \\ z_n \end{bmatrix}} \quad (11)$$

where a, b, c, d, e, f, g are the parameters defined by the camera model, $x_n, y_n, z_n$ are the world coordinates and $u_n, v_n$ are the image coordinates for the x axis and y axis.

Equations (10) and (11) must be applied to the input of stereo images 810 and 820 in step 840 using their respective calibration parameters 830: $(a_{1L}, a_{2L}, \ldots g_{1L}, g_{2L})$ for the left image and $(a_{1R}, a_{2R}, \ldots g_{1R}, g_{2R})$ for the right image. Once the mapping 840 between world coordinates and image coordinates for the stereo rig is defined, an interpolation operation 850 is applied. The output 860 of the stereo rectification procedure is left and right images stereo rectified.

Radiometric Calibration Procedure

Calibrating light anisotropy and the relative orientation of the anisotropy with respect to each camera are required to recover depth information from scene objects considering an arbitrary or unknown surface reflectance. In order to, the radiometric calibration method defines a effective sensitivity function by a mixture of a small number of given positive semi-definite kernels, ker(i)

$$\mu_n(i) = \sum_{l=1}^{L} \alpha_i^l ker(i - i_0^l) \quad (12)$$

whose control points $i_0^l$ are fixed locations in the image plane, i denotes an image pixel and $\mu_n(i)$ is the reconstructed effective sensitivity for n cameras.

Bi-cubic kernel $$ker(x, y) = \sum_{u=0}^{2} a_u x^u \cdot \sum_{v=0}^{2} b_v y^v$$

is used in step 950 to recover the radiometric parameters 970 of each $\mu_n$. Equation (12) can be written as follows $$\mu_n(i) = a_0 b_0 + a_0 b_1 y + a_0 b_2 y^2 + a_1 b_0 x + a_1 b_1 xy + a_1 b_2 xy^2 + a_2 b_0 x^2 + a_2 b_1 x^2 y + a_2 b_2 x^2 y^2 \quad (13)$$

Sampling

When the radiometric calibration object of known geometry is inserted in the scene and images 910 and 920 of the object are acquired, the surface points $x^s, x=1, 2 \ldots S$ are sampled in step 940 from the known parametric model of the calibration object.

Figure 9:
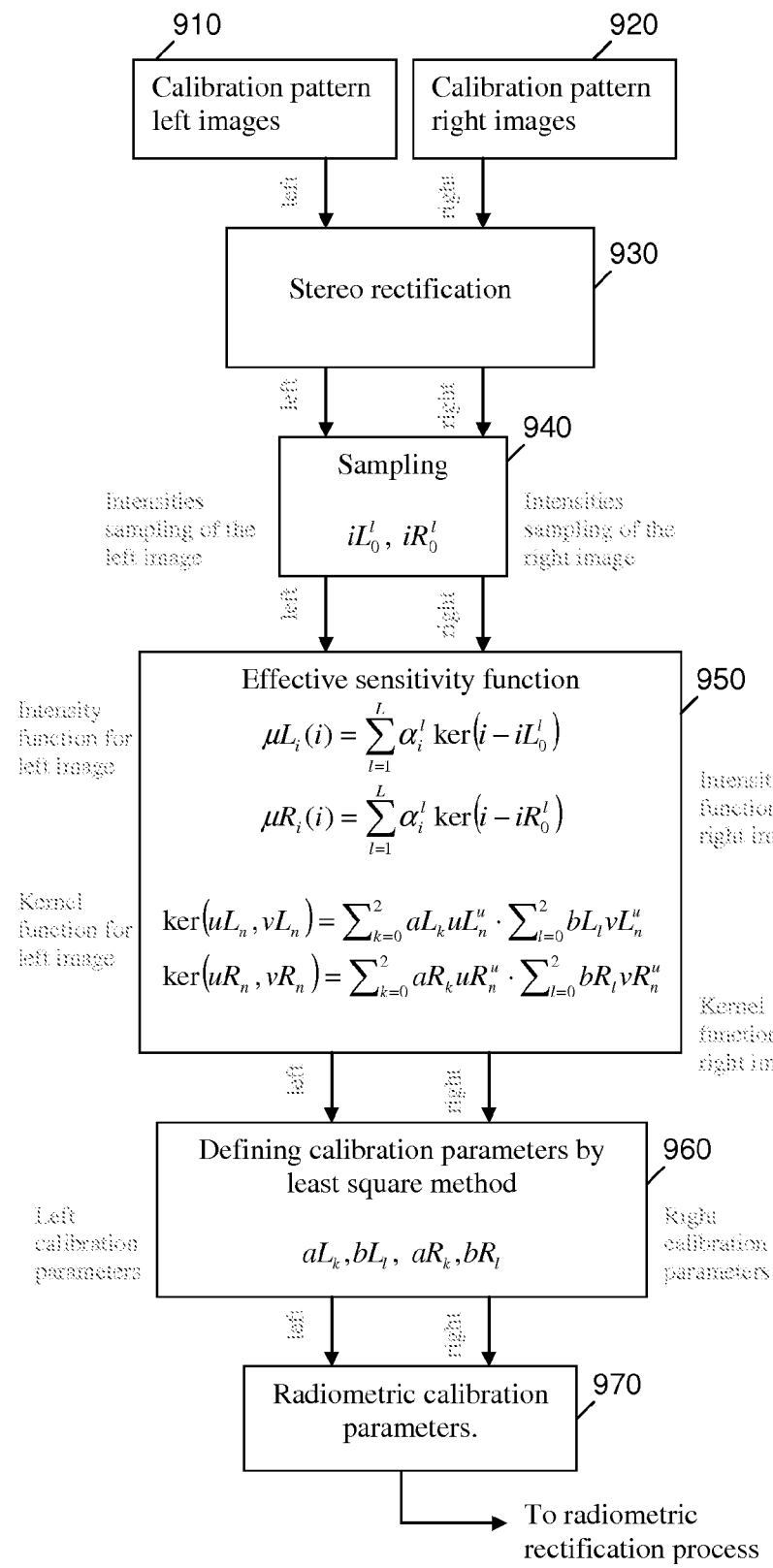
FIG. 9 is a block diagram of the radiometric calibration process.

The 3D points $x^s$ are projected to images via geometric calibration parameters in step 930. One 3D point $x^s$ gives one equation linear in $\alpha_0^l$. In total, S equations are obtained for n×L unknowns (L unknowns for each of the n cameras). The system is then solved by the least square method in step 960. This radiometric calibration procedure is shown in FIG. 9.

Radiometric Rectification

Figure 10:
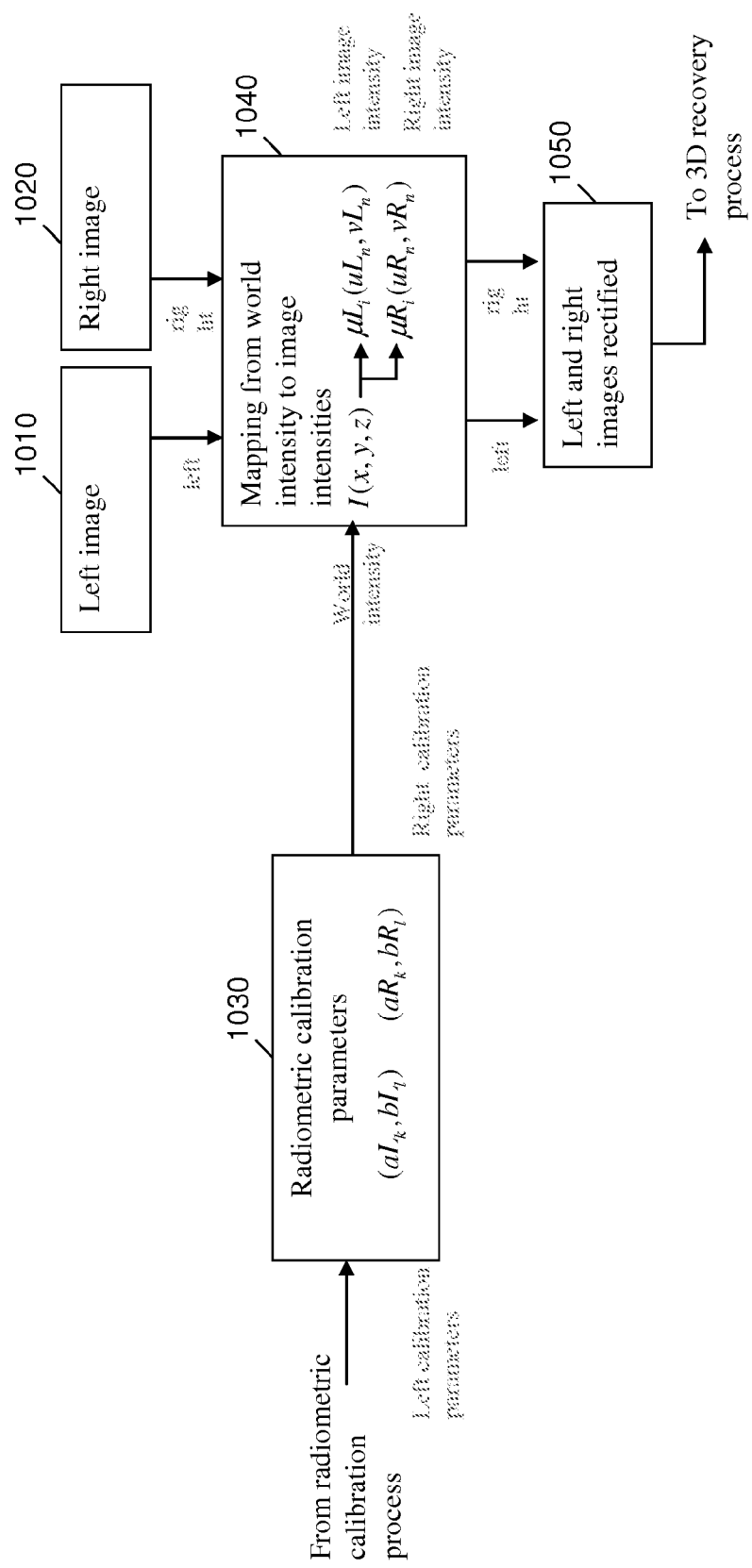
FIG. 10 is a block diagram of the radiometric rectification process.

As shown in FIG. 10, once the set of radiometric calibration parameters 1030 are obtained for each view point 1010 and 1020 of the stereo rig and the stereo rectification process is applied, the radiometric rectification process is done, that is, the radiometric calibration parameters are applied to the stereo images, such that, the isotropic illumination on every epipolar line is satisfied.

The relationship between real intensities and image intensities is represented by the following equation, utilized in step 1040

$$I(x,y,z) = \mu_n(u_n, v_n) \quad (14)$$

The equation (14) is applied in step 1040 to the stereo images using the respective left and right calibration parameters. The output of this procedure is left and right images 1050 radiometrically rectified.

Three Dimensional Recovery Procedure

The optical basis of the stereo recovery technique based on BRDF (Bidirectional Reflectance Distribution Function) reciprocity is to exploit the symmetry of the surface reflectance. This optical property is achieved if the light sources and camera position fulfill the condition that the radiance energy falling onto the image plane, depends only on the surface shape and is independent of the BRDF.

To fulfill the constraint of reflectance reciprocity, it is necessary that the BRDF or the amount of incident and emitted energy must be the same for the selected position of the camera and the light source, this is represented as $\rho(\hat{V}_i, \hat{V}_e) = \rho(\hat{V}_e, \hat{V}_i)$.

One way to obtain these conditions is with a stereo assembly. For example, if a camera and light source are placed and moved apart by a known distance (the base line); then the left image is acquired with the camera on the left position and the light source on the right position. After this, the camera and light source are swapped to acquire the right image. The positions for the left and right cameras are defined by $O_l$ and $O_r$. A spatial point P has two direction vectors and these are defined by $V_l$ and $V_r$. Finally, the surface normal at this point is denoted by $\hat{n}$.

Because of reflectance reciprocity, it is known that $\rho(\hat{V}_r, \hat{V}_l) = \rho(\hat{V}_l, \hat{V}_r)$, and without considering the fall-off per unit-strength of an isotropic light source, the matching constraint remains as:

$$(e_l \hat{V}_l - e_r \hat{V}_r) \cdot \hat{n} = 0 \quad (15)$$

Figure 11:
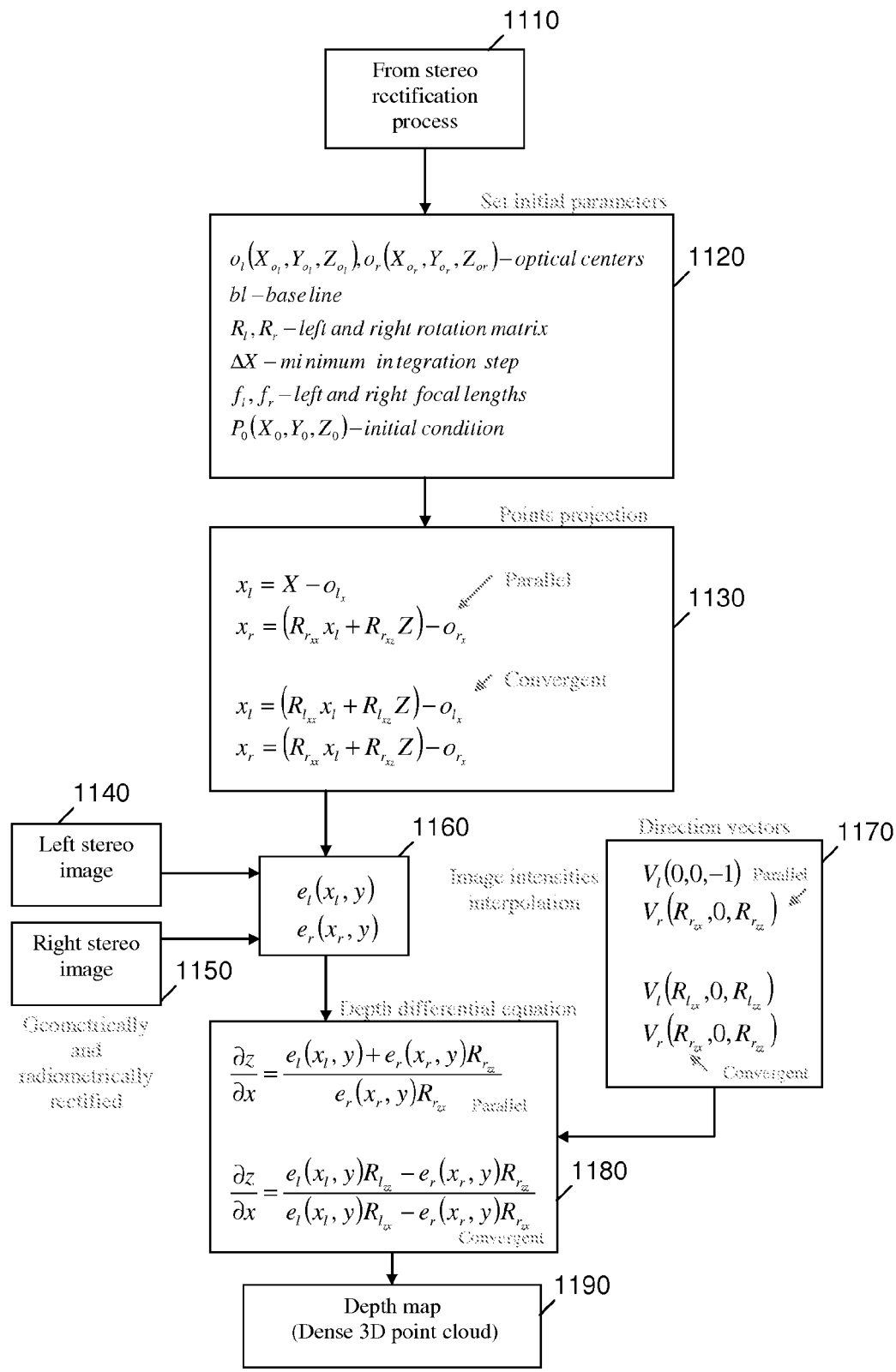
FIG. 11 is a block diagram of the three dimensional recovery process considering orthographic projection.
Figure 12:
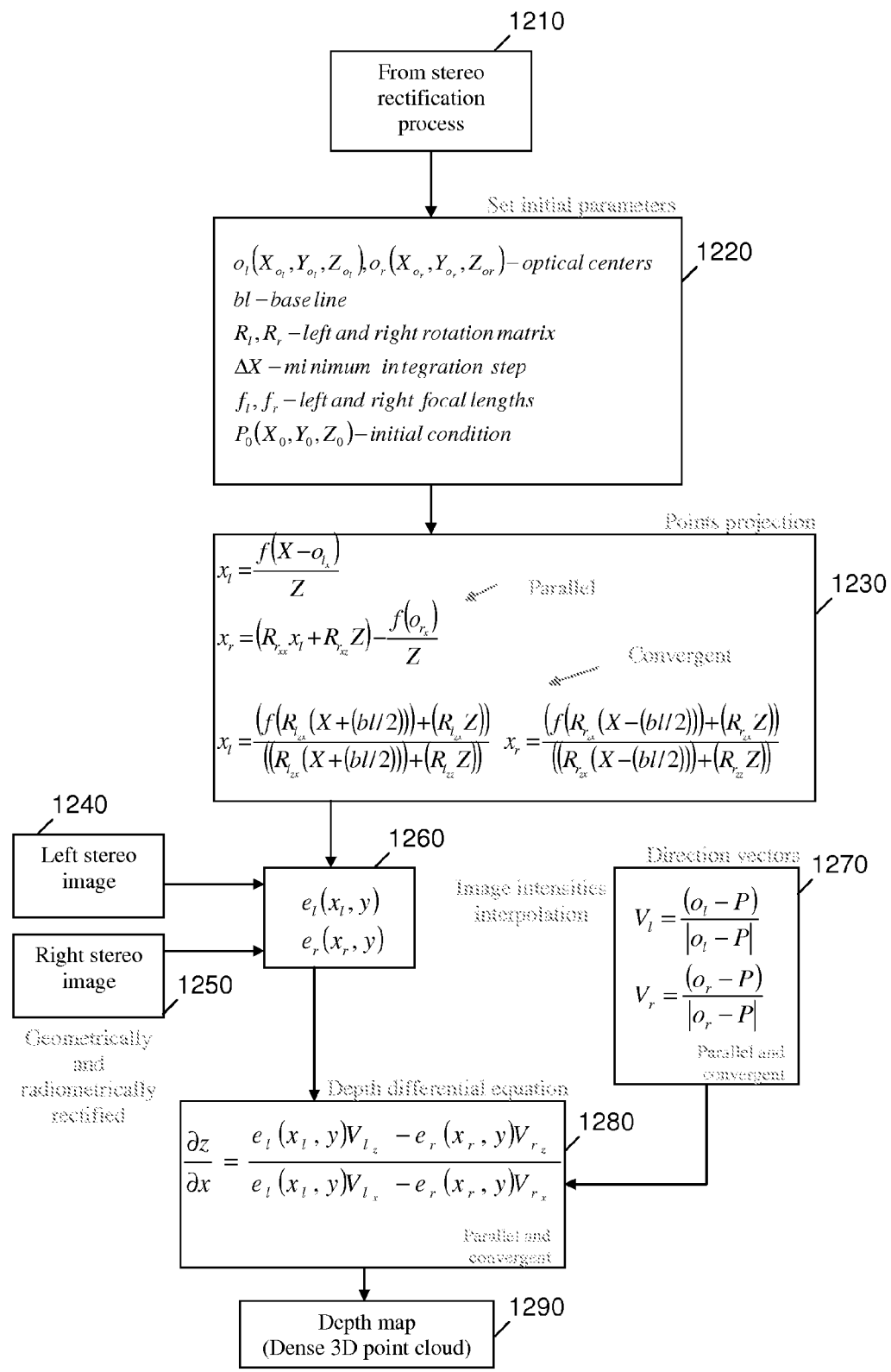
FIG. 12 is a block diagram of the three dimensional recovery process considering perspective projection.

Following block diagrams on FIGS. 11 and 12, the depth recovery process is presented considering two cases of geometry for spatial point's projection. First the orthographic projection is explained and after the perspective projection is presented, for both cases, it is deduced the matching constraint for depth recovery expressed as a partial differential equation.

Orthographic Projection

The depth recovery process is applied to geometrically and radiometrically reciprocal stereo images 1140 and 1150, that is, the epipolar geometry constraint is fulfilled which means that the search space for corresponding points is reduced from a 2D array (a matrix) to a 1D array (a vector), moreover, both images of the stereo pair have an isotropic light distribution.

To deduce the matching constraint for depth recovery, it is established a geometric framework for a coplanar stereo camera setup, that is, the left and right optical axes are parallel. Initial parameters are set in step 1120. For orthographic projection, a surface point P(X,Y,Z) is projected onto the image plane as p(x,y) in step 1130. If the depth is considered a function of the image coordinates and the object to be recovered represents a first order continuity surface curve, then Z=Z(x,y) and can be expressed using the normal vector definition of photometric stereopsis, n̂=(p, q, −1) where $$p = \frac{\partial z}{\partial x} \text{ and } q = \frac{\partial z}{\partial y}.$$

From the equation of the matching constraint derived from the BRDF reciprocity analysis and considering the geometrical framework explained before; it is possible to set a reference coordinate system for the left camera position assuming an identity rotation matrix, therefore, the left direction vector $V_l$ (1170) is aligned with the Z axis, and if a minimum rotation angle is considered for the right camera (a rotation angle less than 3 degrees keeps a coplanar analysis), then the right direction vector $V_r$ (1170) is obtained from the right rotation matrix (1130).

Because of the epipolar constraint fulfillment the partial derivative on y term is eliminated, and finally, the matching constraint is simplified and the following differential equation is deduced:

$$\frac{\partial z}{\partial x} = \frac{e_l(x, y) + e_r(x_r, y)R_{r_{zz}}}{e_r(x_r, y)R_{r_{zx}}} \quad (16)$$

where $e_l(x,y)$ and $e_r(x_r,y)$ 1160 are the reciprocal image intensities for each image point. This partial differential equation 1180 can be solved by a numerical integration methodology, restricted by an initial condition set in step 1120. For each epipolar line a known depth value for a surface point is required to integrate along the epipolar lines.

Now, if the stereo camera geometry is convergent, that is, significant rotation angles relate the left and right optical axes. Then, it is necessary to introduce the rotation parameters for both cameras of the stereo array. That is, a spatial point P will project onto the left image plane at $p_l(R_{l_{xx}}X+R_{l_{xz}}Z, y)$ and onto the right image plane at $p_r(R_{r_{xx}}X+R_{r_{xz}}Z, y)$ in step 1130, both considering the orthographic projection principle and the epipolar geometry. Moreover the direction vectors 1170 for the left and right cameras can be obtained from the left and right rotation matrix. Finally, substituting variables on the general stereo matching constraint, the next partial differential equation is deduced:

$$\frac{\partial z}{\partial x} = \frac{e_l(x_l, y)R_{l_{zz}} - e_r(x_r, y)R_{r_{zz}}}{e_l(x_l, y)R_{l_{zx}} - e_r(x_r, y)R_{r_{zx}}} \quad (17)$$

where $e_l(x,y)$ and $e_r(x_r,y)$ 1160 are the reciprocal intensities for each image point. In the same way, this partial differential equation 1180 can be solved for each epipolar line by a numerical integration methodology considering a known initial condition.

For the geometrical analysis explained before, it is necessary to know explicitly the extrinsic parameters 1110 for both cameras of the stereo array. A windowed approach is included for reduction of the point's projection error to obtain the left and right reciprocal intensities ($e_l$ and $e_r$). The result of the three-dimensional recovery process is a dense depth map 1190.

Perspective Projection

In the same way that for orthographic projection, the analysis herein presented assumes that the stereo images pair 1240 and 1250 is radiometrically and geometrically calibrated, in such a way that, intrinsic and extrinsic parameters 1210 and 1220 are known and the epipolar geometry constraint is fulfilled.

Considering a coplanar stereo camera configuration with a minimum rotation angle (less than 3 degrees keeps a coplanar analysis) for one of the cameras, and following the perspective point's projection principle, it is known that a surface point is projected onto the left and right image plane in step 1230 by similar triangles as $$p_l\left(\frac{fX}{Z}, y\right) \text{ and } p_r\left(\frac{f(XR_{r_{xx}} + ZR_{r_{xz}})}{Z}, y\right);$$

where the focal length (f) is obtained from the previous geometrical calibration process as well as the rotation coefficients.

In the same way, if a convergent camera setup is considered, the rotation parameters will affect the point's projection equations for both image planes, that is, a space point P(X,Y,Z) is projected in step 1230 onto the left image plane as $$p_l\left(\frac{f(XR_{l_{xx}} + ZR_{l_{xz}})}{Z}, y\right),$$

and onto the right image plane as $$p_r\left(\frac{f(XR_{r_{xx}} + ZR_{r_{xz}})}{Z}, y\right).$$

Because of perspective projection, the direction vectors 1270 for both cameras are calculated from the spatial and image coordinates of corresponding points. Now, considering depth as a function of the image coordinates, in such a way that, $$\hat{n} = \left(\frac{\partial z}{\partial x}, \frac{\partial z}{\partial y}, -1\right)$$

and replacing all parameters on the general matching constraint for depth recovery, the following partial differential equation 1280 is derived:

$$\frac{\partial z}{\partial x} = \frac{e_l(x_l, y)V_{l_z} - e_r(x_r, y)V_{r_z}}{e_l(x_l, y)V_{l_x} - e_r(x_r, y)V_{r_x}} \quad (18)$$

where $e_l(x,y)$ and $e_r(x_r,y)$ 1260 are the reciprocal intensities for each image point. This equation integrates the depth of the object to be recovered along the corresponding epipolar lines, and it is solved by a numerical integration method assuming a known initial condition. The final result of this three-dimensional recovery process is a dense depth map 1290.

Depth Map Calibration and Rectification

After the three dimensional recovery process, it is necessary to apply a depth map calibration process in order to obtain highly accurate depth maps. The 3D calibration process is performed by fitting the depth map measurements 1340 to a set of a priori known measurements 1330 of a highly accurate 3D calibration object such as a triangular gauge block. Depth map fitting is carried out by computing the depth map calibration model parameters through minimizing the squared distance between the 3D calibration object measurements and the corresponding depth map measurements. The 3D calibration model parameters 1360 include a scaling factor $\alpha$ and an offset $\beta$. Equation (19), used in step 1350, defines the depth map calibration relation.

$$z^{calib}_{depth\ map} = \alpha z_{depth\ map} + \beta \qquad (19)$$

The set of measurements 1330 of a 3D calibration object are manually selected and obtained, and the 3D calibration process fits these measurements to a plane in the scene-coordinate system. This plane is used for depth map calibration since in the image-coordinate system, the image points corresponding to the scene-coordinate points of the 3D calibration object also form a plane.

Figure 13A:
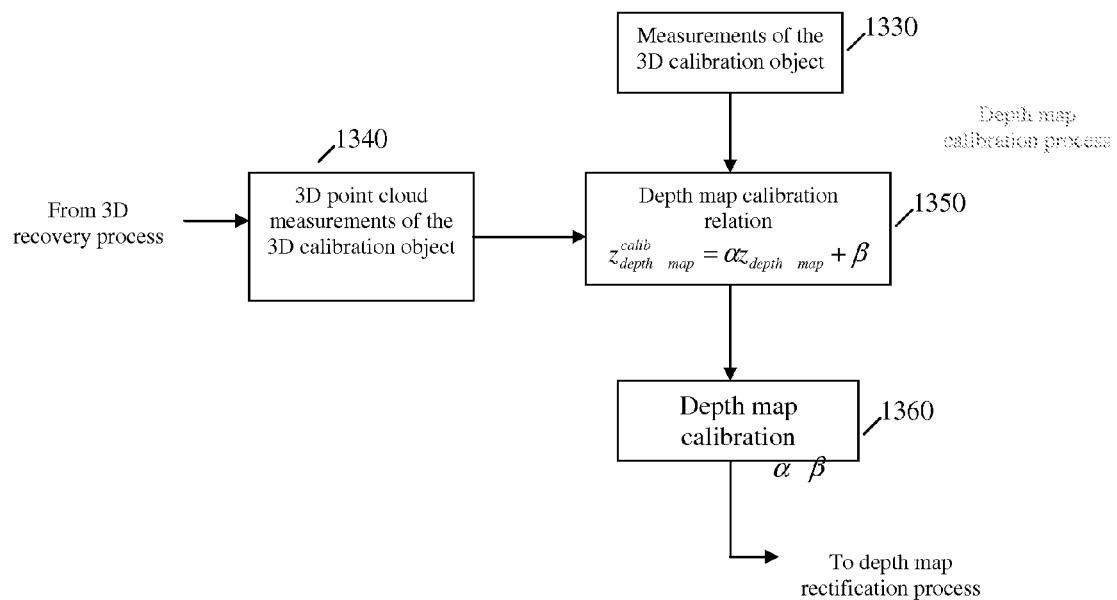
FIG. 13A is a diagram of the depth map calibration processes.
Figure 13B:
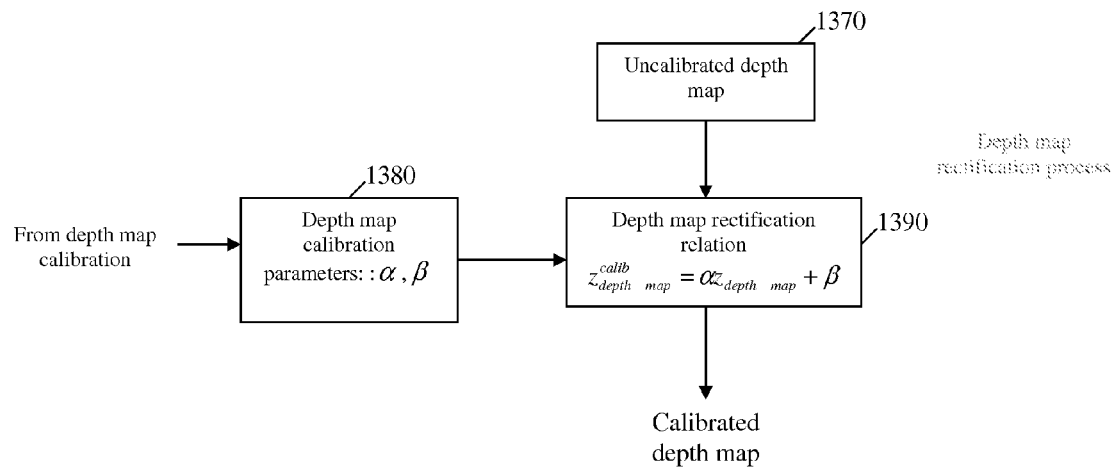
FIG. 13B is a diagram of the depth map rectification process.

For finding the calibration parameters it is necessary to use a linear least square approach and to minimize the square error in z (the axis perpendicular to the image plane). We fit the plane ax+by−z+d=0 to the scene-coordinate locations. Using the computed plane parameters (a, b, d) the substitution for $$z^{calib}_{depth\ map}$$

can be made using equation (19) in step 1350 and solve (in linear least square fashion) the resulting problem over all known points to obtain parameters 1360, $\alpha$ and $\beta$. After that, the rectification process 1390 is carried out by applying the 3D calibration parameters 1380 ($\alpha$ and $\beta$) to the depth map 1370 recovered of any object imaged. The calibration and rectification processes are shown in FIGS. 13A and 13B.

Figure 14:
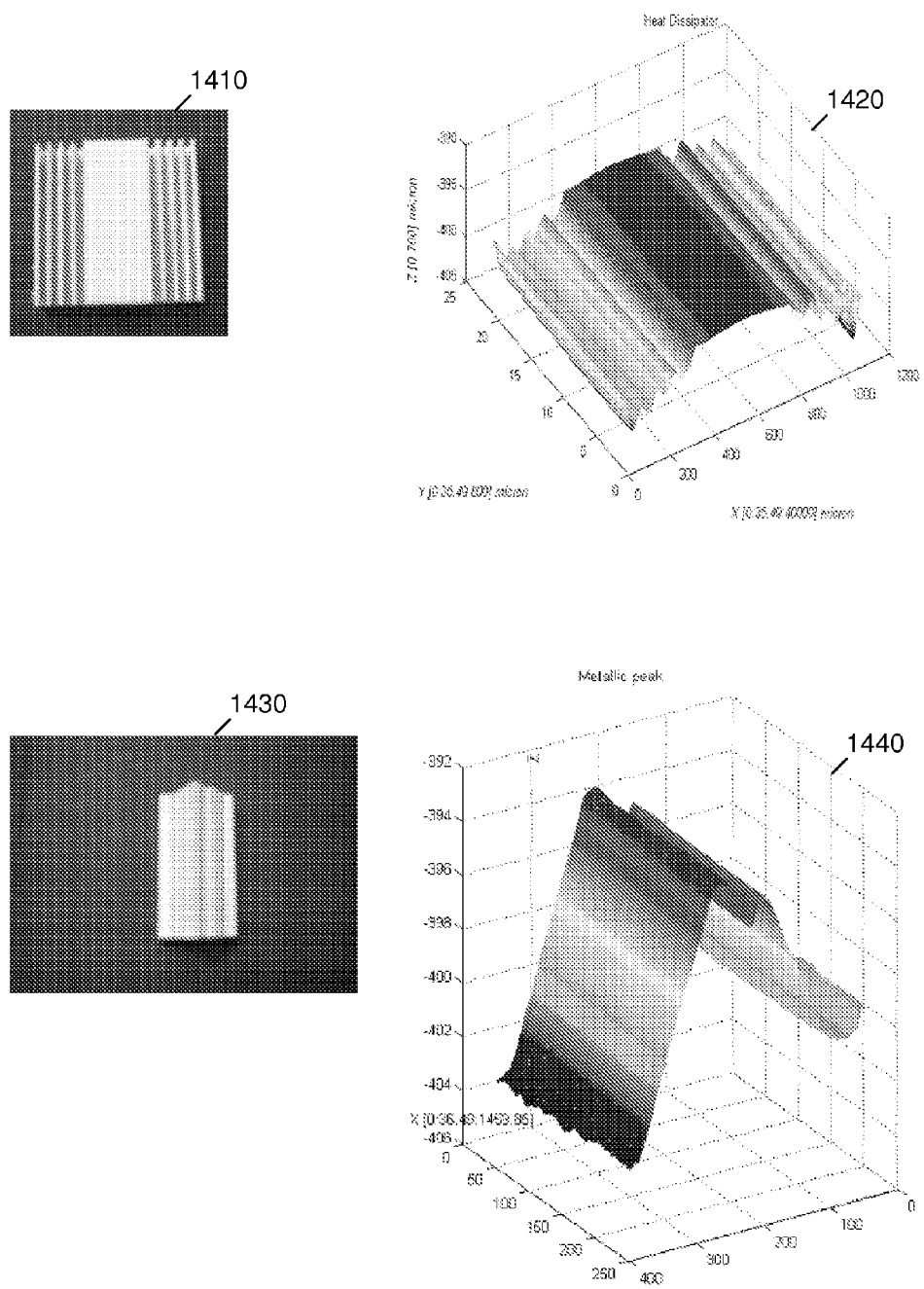
FIG. 14 is a diagram of examples of the three dimensional recovery.

In FIG. 14 two depth map graphs 1420 and 1440 in micron level scale are shown. The graphs illustrate the models of two metallic pieces obtained with the present invention, a heat dissipater 1410 and a peak 1430.

The present invention is a method and apparatus for stereo and radiometric calibration and a three dimensional stereo technique to obtain accurate dense maps without previous knowledge of surface reflectance. Unlike prior art, the system only uses two object images for three dimensional modeling of objects regardless their reflectance distribution. The system takes advantage of the reflectance symmetry of surfaces, that is, the system can handle textureless and specular surfaces. The system also uses interior illumination sources to align the optical axis with the beam of light. The system allows the automatic commutation of the stereo light sources to fulfill the reciprocity property of the images.

In an alternative embodiment of the present invention, different light wavelengths (color, IR or UV illumination) could be used in order to better contrast the surface for better quality in the 3D information recovered. Also, different wavelengths could be used in combinations (imaging with different colors, infrared or UV) to recover better 3D surfaces using differential methods. The use of polarized illumination and/or polarizers in the camera heads to recover 3D using single time image capture is also possible in alternative embodiments, or to recover better 3D estimates using the reflection of polarized light equations.

Although the invention has been described by way of examples of preferred embodiments, it is to be understood that various other adaptations and modifications may be made within the scope of the invention. Therefore, it is the object of the append claims to cover all such variations and modifications as come within the scope of the invention.

The invention claimed is:

1. An automated system for three-dimensional recovery of an object placed inside the field of view of a plurality of cameras, comprising:
   an illumination and image acquisition apparatus configured for the acquisition of reciprocal stereo images of said object without physical movement of said plurality of cameras;
   a computational apparatus programmed to recover depth data of said object from said reciprocal stereo images, wherein stereo rectification utilizing stereo calibration parameters is used for perspective projection reconstruction, wherein radiometric rectification utilizing radiometric calibration parameters is used, and wherein said depth data can be recovered regardless of the reflectance properties of said object;
   wherein said computational apparatus is further programmed to perform automatic calibration of said system based on a plurality of stereo calibration images, said automatic calibration comprising radiometric calibration and geometric calibration, said geometric calibration generating said stereo calibration parameters based on a non-symmetric calibration model that breaks down the total calibration area into a plurality of sections and computes localized calibration parameters for each of said plurality of sections, and said radiometric calibration generating said radiometric calibration parameters.

2. The system of claim 1 where said plurality of stereo calibration images comprise geometric patterns, radiometric patterns and images taken of three dimensional calibration objects.

3. The system of claim 1 wherein said image acquisition apparatus comprises an array of cameras.

4. The system of claim 1 wherein said automatic calibration models the stereo and radiometric characteristics of said plurality of cameras, wherein a plurality of stereo and radiometric calibration parameters are determined for geometrical and radiometric distortion.

5. The system of claim 1 wherein said automatic calibration rectifies the stereo and radiometric characteristics of said plurality of cameras such that the geometrical and radiometric distortion on stereo images is eliminated.

6. The system of claim 1 wherein said computational apparatus utilizes a model for describing the mapping relation between spatial coordinates and image coordinates using linear equations.

7. The system of claim 1 wherein said computational apparatus characterizes a plurality of cameras by feeding a set of linear equations with spatial coordinates and images coordinates of a calibration pattern.

8. The system of claim 1 wherein said computational apparatus characterizes light source behavior by feeding a linear equation with images intensities of a calibration pattern.

9. The system of claim 1 wherein said illumination and image acquisition apparatus comprises a plurality of cameras assembled with a plurality of light sources.

10. The system of claim 1 wherein said illumination and image acquisition apparatus comprises an assembly to allocate one or more cameras and light source stereo arrays for the object acquisition from a variety of viewpoints.

11. The system of claim 1 further comprising:
a light source commutation apparatus utilized to fulfill the reciprocity property of image intensities.

12. The system of claim 1 wherein the light sources are allocated out of the optical center positions such that different reciprocity ratios of image intensities are obtained.

13. A method for three-dimensional recovery of an object placed inside the field of view of a plurality of cameras, comprising the steps of:
illuminating an object and acquiring reciprocal stereo images without physical movement of said plurality of cameras;
performing stereo rectification utilizing stereo calibration parameters for perspective protection reconstruction;
performing radiometric rectification utilizing radiometric calibration parameters;
recovering depth data of said object from said reciprocal stereo images, wherein said depth data can be recovered regardless of the reflectance properties of said object; and
performing geometric calibration generating said stereo calibration parameters based on a plurality of stereo calibration images using a non-symmetric calibration model comprising the sub-steps of:
separating the total calibration area into a plurality of sections; and
computing localized calibration parameters for each of said plurality of sections; and
performing radiometric calibration generating said radiometric calibration parameters.

14. The method of claim 13 where said plurality of stereo calibration images comprise geometric patterns, radiometric patterns and images taken of three dimensional calibration objects.

15. The method of claim 13 wherein said step of illuminating and acquiring utilizes an array of cameras.

16. The method of claim 13 wherein said step of automatically calibrating models the stereo and radiometric characteristics of said plurality of cameras, wherein a plurality of stereo and radiometric calibration parameters are determined for geometrical and radiometric distortion.

17. The method of claim 13 wherein said step of automatically calibrating rectifies the stereo and radiometric characteristics of said plurality of cameras such that the geometrical and radiometric distortion on stereo images is eliminated.

18. The method of claim 13 wherein said step of recovering utilizes a model for describing the mapping relation between spatial coordinates and image coordinates using linear equations.

19. The method of claim 13 wherein said step of automatically calibrating characterizes a plurality of cameras by feeding a set of linear equations with spatial coordinates and images coordinates of a calibration pattern.

20. The method of claim 13 wherein said step of automatically calibrating characterizes light source behavior by feeding a linear equation with images intensities of a calibration pattern.

21. The method of claim 13 wherein said step of illuminating and acquiring utilizes a plurality of cameras assembled with a plurality of light sources.

22. The method of claim 13 wherein said step of illuminating and acquiring utilizes an assembly to allocate one or more cameras and light source stereo arrays for the object acquisition from a variety of viewpoints.

23. The method of claim 13 wherein said step of illuminating and acquiring utilizes a light source commutation apparatus to fulfill the reciprocity property of image intensities.

24. The method of claim 13 wherein said step of illuminating and acquiring utilizes light sources allocated out of the optical center positions such that different reciprocity ratios of image intensities are obtained.

25. The system of claim 1,
wherein said computation apparatus is programmed to perform depth map rectification utilizing depth map calibration parameters in the recovery of depth data; and
wherein said automatic calibration further comprises generating depth map calibration parameters.

26. The method of claim 13, further comprising said steps of:
performing depth map rectification utilizing depth map calibration parameters; and
performing depth map calibration generating depth map calibration parameters.

* * * * *